United States Patent [19]

Perko

[11] Patent Number: 4,875,966

[45] Date of Patent: Oct. 24, 1989

[54] PRESSURE TRANSFER PLATE ASSEMBLY FOR A HEAT BONDING APPARATUS

[75] Inventor: Louis S. Perko, Rancho Cucamonga, Calif.

[73] Assignee: General Dynamics Corp., Pomona Div., Pomona, Calif.

[21] Appl. No.: 242,580

[22] Filed: Sep. 12, 1988

[51] Int. Cl.[4] ........................ B30B 7/00; B30B 15/00; B23Q 3/18

[52] U.S. Cl. ...................................... 156/580; 29/467; 29/848; 156/583.1; 269/47; 269/903

[58] Field of Search .................. 156/580, 583.1, 583.3; 425/193; 100/93 P; 269/47, 52, 54.5, 309, 903; 29/464, 467, 830, 848, 849

[56] References Cited

U.S. PATENT DOCUMENTS

| | | | |
|---|---|---|---|
| 1,806,887 | 5/1931 | Bruno | 269/54.5 |
| 2,092,410 | 9/1937 | Wheeler | 425/411 |
| 2,330,577 | 9/1943 | Hampf | 269/54 |
| 2,372,716 | 4/1945 | Evans | 83/701 |
| 2,389,184 | 11/1945 | Cooke | 269/47 |
| 2,433,412 | 12/1947 | Wilson | 425/510 |
| 2,576,003 | 11/1951 | Dry | 269/46 |
| 2,707,419 | 5/1955 | Schron | 269/47 |
| 3,143,787 | 8/1964 | Babbe | 29/848 |
| 3,161,945 | 12/1964 | Anderson et al. | 29/848 |
| 3,540,128 | 11/1970 | Giles | 33/520 |
| 3,746,488 | 7/1973 | Messenger | 425/195 |
| 3,942,780 | 3/1976 | Clement | 269/47 |
| 4,191,366 | 3/1980 | Rabin | 269/47 |
| 4,270,253 | 6/1981 | Herb et al. | 29/26 A |
| 4,431,474 | 2/1984 | Gronek et al. | 156/583.1 |
| 4,500,079 | 2/1985 | Morghen | 269/47 |
| 4,506,442 | 3/1985 | Alzmann et al. | 29/830 |
| 4,598,453 | 7/1986 | Wills | 29/271 |

FOREIGN PATENT DOCUMENTS

| | | | |
|---|---|---|---|
| 3535493 | 4/1987 | Fed. Rep. of Germany | 269/903 |
| 8303065 | 9/1983 | PCT Int'l Appl. | 29/848 |

*Primary Examiner*—Michael W. Ball
*Assistant Examiner*—Steven D. Maki
*Attorney, Agent, or Firm*—Henry Bissell; Leo R. Carroll

[57] ABSTRACT

An improved pressure transfer plate assembly is provided for an apparatus to heat bond flexible printed circuits in a hydraulic press. The plate assembly comprises aluminum top and bottom plates with two or more thin sheet liners in between. A plurality of workpiece-locating pins are based in stainless steel plug inserts in the bottom plate to give excellent wear resistance. The alignment of top and bottom plates is effected by a plurality of plate-alignment pins screwed into the bottom plate and having slotted head portions to allow for easy removal and installation.

15 Claims, 1 Drawing Sheet

PRESSURE TRANSFER PLATE ASSEMBLY FOR A HEAT BONDING APPARATUS

This invention was made with Government support under Contract No. N00024-86-C-5301 awarded by the U.S. Navy. The Government has certain rights in this invention.

BACKGROUND OF THE INVENTION

1. Field of the Invention

This invention relates to heat bonding apparatus and, more particularly, to apparatus for heat bonding flexible printed circuits in a hydraulic press.

2. Description of the Related Art

The fabrication of printed circuit boards and flexible harnesses is carried out by assembling multiple layers of material and laminating them in a heat bonding press. The assembled layers to be laminated are placed between the plates of a pressure transfer plate assembly before heat bonding takes place. Various layers are built up on a set of workpiece-aligning pins which go through corresponding holes in the layers. A second set of pins is used to align the pressure plates with respect to each other. In previous arrangements of the plate-alignment pins, the removal and replacement of them was time-consuming and labor-intensive. The plate-alignment pins are ordinarily press-fitted into the bottom plate of the pressure transfer plate assembly, so that when one of them becomes bent, worn, or broken it is difficult to replace. Furthermore, the conventional arrangement for the workpiece-aligning pins leads to fairly rapid wear of the aluminum bottom plate by the pin in its hole, which leads to inaccurate alignment of the workpiece. It would be a great advantage in the art of laminating printed circuit boards and flex harnesses if an improved pressure transfer plate assembly were developed which obviated the two problems referred to above.

Some examples of the related art are briefly discussed below.

U.S. Pat. No. 2,330,577 to Hampf relates to a centering device for the cutting of sheet metal disks in which the cutting members are stationary while a rotary movement is imparted to a plate during the cutting operation about the center of a pointed pivot. The centering pivot and the bed or matrix pertaining thereto are arranged on pins adapted to be turned about the central axis, with the pins being mounted in corresponding parts of the machine frame such that an axial movement imparted to the pins brings them toward one another when they are turned in the same direction. The pins tend to clamp the piece of sheet metal between the pivot and the bedding in the process of cutting to prevent play.

U.S. Pat. No. 2,372,716 to Evans relates to a locating key device by means of which a jig, tool, or other fixture may be mounted upon a table having a slot or groove therein to receive a portion of the key which projects from the fixture, the key being of such formation that by turning it to adjusted positions it may accommodate itself to tables having slots of different widths.

U.S. Pat. No. 2,389,184 to Cook relates to releasable clamping and securing devices for use in drill jigs and similar type fixtures. A plurality of spaced clamping devices is provided to clamp a top plate against a workpiece. Each clamping device comprises generally a threaded member or a bolt on the plate, a pin fixed in the plate, and a cam element in threaded engagement with the bolt and cooperable with the pin.

U.S. Pat. No. 2,576,003 to Dry is directed to an alignment bolt for use by an automobile mechanic in replacing an engine gasket. A plurality of such bolts are used to maintain the gasket in alignment with the crankcase and oil pan. Each bolt is provided with a threaded end for threaded engagement with the threaded openings of a flange. The bolt includes a cylindrical portion adjacent the threaded end thereof and a cylindrical head formed on the other end of the bolt with a diameter greater than the cylindrical portion. The exterior surface of the head is knurled to facilitate manual turning of the bolt. The head is also provided with a transversely extending slit or kerf for the reception of an end of a screwdriver for tightening the bolt. Positioned on the cylindrical portion of the bolt is a tapered conical helical or coil spring with a portion arranged in abutting relation to the head and one end secured in a socket of the bolt.

U.S Pat. No. 2,707,419 to Schron is directed to means for locating fixture plates with respect to the beds or platens of machine tools. A combination is provided of a fixture plate having circular openings therein, and fixture keys having circular shanks disposed in the openings and heads of various polygonal shapes centrally disposed relatively to the shanks and depending from the fixture plate. These keys are adapted for movement in the T-slots or grooves of the bed or platen of machine tools, such as milling machines.

U.S. Pat. No. 3,540,128 to Giles is directed to a ready-built base plate having a precision-made pattern of holes in it that are equally spaced and with a central slip hole or register. The pattern of holes provides quick and proper location and positioning of parts to be machined. The base plate is so constructed as to permit various accessories secured to the plate by means of bolts from the face side of the plate as well as from the bottom side, all the while using the same hole in the same location. The base plate may be used with various locator devices, in particular a device comprising a body, three locating rods, a tapered pin, and four screws. The body has a hole through it which is threaded on one end, and three other holes, each of which is equally spaced at 120° to receive locating rods. The locating body is equipped with a shank which is received by the register hole of the plate. The locating body further receives a tapered pin which can be moved in or out by means of a setscrew threaded at the end of the body. As the tapered pin is pushed into the body by adjusting the setscrew, it pushes out locating rods on the top of the body to the desired position.

U.S. Pat. No. 3,746,488 to Messenger is directed to an apparatus for removable holding mold cavity sections to mold plates, wherein the mold plate includes a regular, rectangular array of identical, cylindrical openings extending perpendicular to the plane of the plate and partway therethrough, the openings being arranged in a plurality of rows and columns with the openings being equally spaced apart in the rows and columns. Each of the mold cavity sections has a cylindrical extension adapted to fit into the openings. The mold plate also includes a plurality of slots therethrough perpendicular to the openings and with the edges of the slots slightly overlapping the openings. A plurality of retainer keys or slide bars are slidably positioned in the slots for matingly, lockingly engaging mating keyways or grooves in the mold cavity extension. The slide bars have notices or recesses in their side edges corresponding to the shape of the openings such that they can be moved a short distance, where the recesses register with the openings, for releasing the mold cavity sections without necessitating removal of the slide bar entirely from the plate.

U.S. Pat. No. 3,942,780 to Clement is directed to a drilling or milling machine on which workpieces of thin metal plate can be accurately located for machining. A table formed with openings in regular matrix array occupied by plates at least some of which are apertured is secured to a work plate. A workpiece is located on a rectangular workpiece support plate and clamped thereto. The support plate has two bores, each housing a spring-loaded pin and each adjacent to an opposite corner of the support plate. The pins fit into the respective bores and into adjacent plate apertures of the matrix and are engaged by slotted plates. When moved in one sense the plates pull the pins down against the spring loading to clamp the workpiece support plate and table together, and when moved in the opposite sense allow the pins to release by the spring action so that the workpiece support plate can be removed.

U.S. Pat. No. 4,191,366 to Rabin is directed to a universal planetary clamping device. The base surface of a rigid plate rests upon the work support surface of a machine tool. An insert having an aperture therethrough is journalled within the plate. A pin is detachably affixed to a workpiece and extended through the aperture. Access is provided through the edge of the plate for engaging the pin to the insert and for cammingly advancing and retracting the insert relative to the base surface. The workpiece is drawn against the work bearing of the plate in response to advancement of the insert. Random aperture location to accommodate several randomly placed pins is provided by a plurality of rotatable journalled inserts, each having a slotted aperture.

U S. Pat. No. 4,431,474 to Gronek et al is directed to a thermocompression bonding assembly particularly adapted to bond an array of miniaturized electrical leads to a corresponding array of respectively aligned pads of a metallized circuit. The assembly includes an internally heated bonding thermode that is uniquely secured to only a single, resiliently mounted support rod which forms part of a specially constructed hanger or support assembly. The support assembly includes a platen-mounted, reciprocally displaceable die set, comprising an upper internally cooled metal plate, an intermediate insulative plate, and a lower metal plate formed with two downwardly extending and longitudinally spaced pairs of thermode alignment and backup support brackets The lower plates also include a plurality of downwardly protruding ribs that define horizontally disposed reference alignment points for establishing precise parallelism between the thermode and the support assembly.

U.S. Pat. No. 4,500,079 to Morghen is directed to a removable and replaceable locating pin adapted to locate a workpiece on a tooling fixture for machining thereof. The locating pin includes a locator element having various configurations adapted to cooperate with a workpiece for positioning the workpiece in various directions of restraint. The locating pin is provided with manually actuatable locking means that permits easy adjustment or removal of the specific locator element as a particular machining operation may require.

U.S. Pat. No. 4,506,442 to Alzmann et al is directed to apparatus for stacking a plurality of laminate layers in registered superposed relation to enable the layers to be joined to form a composite board. A table has a surface on which a plurality of laminate layers can be successively stacked in aligned superposed relationship on pins slidably received in respective apertures in the table. The pins rest on support members carried on a lower support table mounted beneath the surface of the table on which the layers are stacked. The lower support table is raised relative to the stack of layers after successive layers have been placed on the pins so that a given projection of the pins from the laminate layers will be obtained.

U.S. Pat. No. 4,598,453 to Wills is directed to a planar workpiece such as a printed circuit board or a ceramic substrate for an integrated circuit which is aligned by apparatus including three pivotal cams that initially fit relatively loosely in three apertures in the workpiece. As the cams are rotated, they contact the sides of the apertures and thereby urge the workpiece into a centered and aligned position.

None of the patents described briefly above discloses a pressure transfer plate assembly for an apparatus to heat bond flexible printed circuits in a hydraulic press that allows the bonding of twice the amount of 15"×16" flex harnesses as is now possible with existing bonding tools, with only a modest increase in labor expenditure. None of the patents describes a lamination bonding tool that will outlast current bonding tool designs by retrofitting the pin position countersink holes with steel inserts and providing the top plate locating pins with threads for easy removal and installation.

SUMMARY OF THE INVENTION

A pressure transfer plate assembly for a heat bonding apparatus in accordance with the present invention principally comprises four basic component parts. The first component part has a pair of top and bottom plates which constitute and define the top and bottom of the apparatus, respectively. The second component part is a standard set of sized liners, either 302 stainless steel plates or silicone rubber pads, depending on whether multilayer printed circuit boards or flex harnesses are being bonded, respectively. The third component part includes standard-issue tooling, self-locating pins. The fourth and final component part of the transfer plate assembly comprises quick-replacement plate alignment pins.

The bottom plate contains the self-locating pins and the quick-replacement plate alignment pins, which extend upwardly from it. Each locating pin has a disk-shaped base portion which fits into a recess in a cylindrical stainless steel insert which has been press-fitted into the bottom plate at the proper location. A plurality of locating pins makes up a first pattern which corresponds to a pattern of holes in the workpiece to be bonded. The various layers of the circuit board or flex harness to be bonded are laid up on the bottom plate by placing the holes in them over the locating pins. Before that is done, however, a liner is placed on the bottom plate. If more than one board or harness assembly is being bonded, other liners are used to separate adjacent assemblies. A final liner is placed over the last assembly to separate it from the top plate.

The top plate has two distinct patterns of holes through it corresponding to the locating pin pattern and the quick-replacement plate alignment pin pattern. The top plate is placed over the bottom plate so that the workpiece-locating pins and the plate alignment pins protrude into their respective holes in the top plate. The workpiece-locating pins fit relatively loosely into their holes in the top plate. Alignment of the top and bottom plates is accomplished by the tight-fitting quick-replacement plate alignment pins. The entire pressure transfer assembly is then placed in the bonding press to effect heat bonding of the workpiece assemblies.

In previous arrangements the plate alignment pins were pressed into holes in the bottom plate, and they were difficult to remove when they became worn or broken. The plate alignment pins in accordance with the present invention are threaded at one end and screwed into tapped holes in the bottom plate. The other ends of the plate alignment pins have transverse slots in them to accommodate a screwdriver blade, thus allowing easy removal and replacement.

Old pressure transfer plates with press-fitted workpiece-locating pins can be retrofitted according to the present invention by providing them with the new quick-replacement top plate alignment pins and replacing the old workpiece-locating pins by the new pins which have their bases fixed in the cylindrical stainless steel plug inserts press-fitted into the bottom plate. The new design is expected to provide a pressure transfer plate assembly with a much longer useful life than that of previously used equipment for the purpose.

BRIEF DESCRIPTION OF THE DRAWING

A better understanding of the present invention may be realized from a consideration of the following detailed description, taken in conjunction with the accompanying drawing in which.

DESCRIPTION OF THE PREFERRED EMBODIMENT

Figure 1:
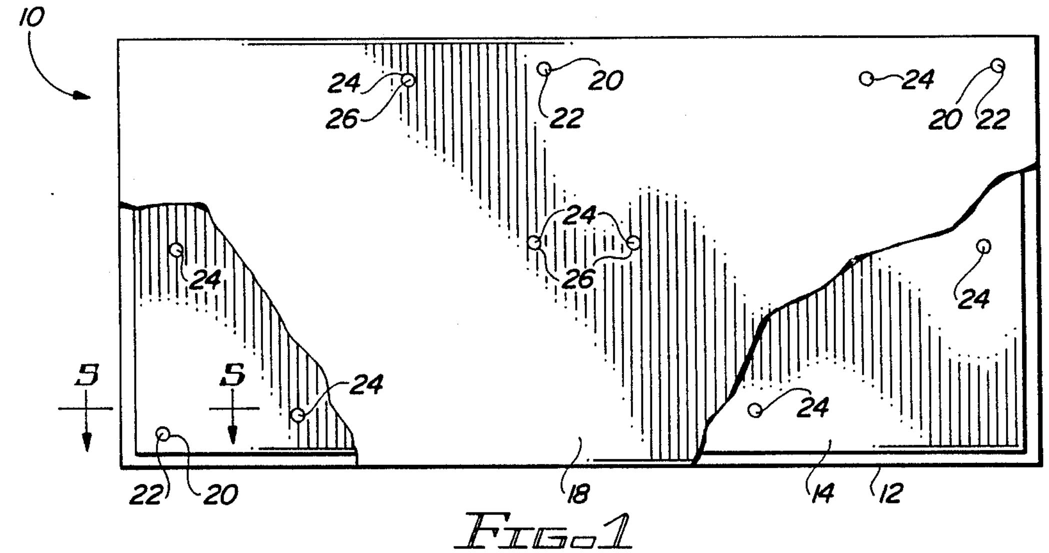
FIG. 1 is a top plan view, partly broken away, of a pressure transfer plate assembly for a heat bonding apparatus.

FIG. 1 shows a top plan view, partly broken away, of a pressure transfer plate assembly for a heat bonding apparatus in accordance with the present invention. The pressure transfer plate assembly 10 comprises a bottom plate 12, a thin sheet liner 14 laid on top of plate 12, a second sheet liner 16 (not shown) on top of liner 14, and a top plate 18 with a plurality of holes therethrough fitting over two distinct sets of pins projecting upward from bottom plate 12 through liners 14 and 16. A first plurality of plate alignment holes 20 accommodates three quick-replacement plate alignment pins 22 whose lower ends are screwed into tapped holes in plate 12. There are three plate alignment holes 20 in transfer plate assembly 10, two of them on a line parallel to the top edge of plate 12 in FIG. 1 and the third in the lower left-hand corner.

A plurality of workpiece-locating pins 24 projecting from bottom plate 12 reside in a plurality of holes 26 through top plate 18. There are eight such workpiece-locating pins 24 and their corresponding holes 26 in transfer plate assembly 10, distributed in a pattern that can be thought of as comprising the corners of two adjacent rectangles, both tilted roughly 45° with respect to the long sides of plates 12 and 14.

Figure 2:
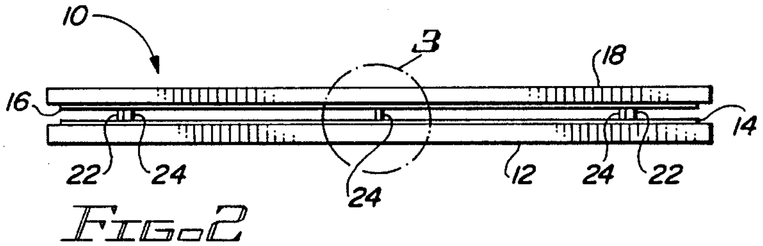
FIG. 2 is an end view of the pressure transfer assembly in elevation.

FIG. 2 is an end elevational view of pressure transfer plate assembly 10 which shows more clearly how the sandwich consisting of bottom plate 12, first sheet liner 14, second sheet liner 16, and top plate 18 is built up on the two sets of pins, the plate locating pins 22 and the workpiece-locating pins 24. Additional liners may be used in the heat bonding process if more than one workpiece assembly is being bonded at one time. A sheet liner is used to separate each adjacent pair of workpiece assemblies from each other.

Figure 3:
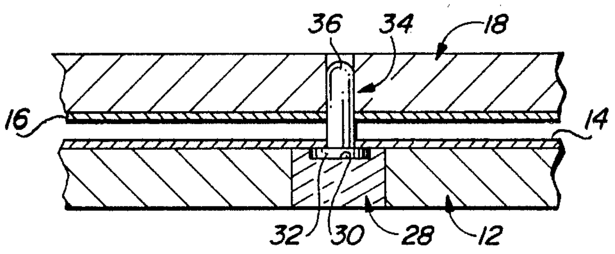
FIG. 3 is a sectional end view of the part of the plate assembly indicated in FIG. 2, showing details of a workpiece-locating pin in its insert.

FIG. 3 is a sectional view showing the details of the area indicated in FIG. 2. A cylindrical stainless steel insert 28 is press-fitted into a hole drilled through bottom plate 12. The top face of plug insert 28 has in it a central disk-shaped recess 30 into which a base portion 32 of a workpiece-locating pin 24 is inserted. A cylindrical body portion 34 of pin 24 with a rounded end 36 projects through holes in liners 14 and 16 into hole 10 in plate 18. The function of workpiece-locating pin 24 is to align the various superposed layers of a printed circuit board or polyimide-kapton flex harness between liners 14 and 16.

Figure 4A:
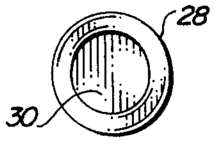
FIGS. 4A and 4B are top plan and side elevational views, partly in section, respectively, of a steel insert.
Figure 4B:
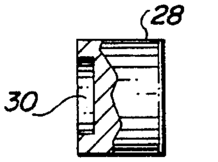

FIGS. 4A and 4B are top plan and side elevational views, respectively, of plug insert 28. Inserts 28 are press-fitted into corresponding holes drilled through bottom plate 12 in the pattern previously described. The base portion 32 of each workpiece-locating pin 24 fits into a recess 30 of an insert 28. Bottom plate 12 is ordinarily made of aluminum, and the use of stainless steel plug inserts 28 results in a wear-resistant, longer-lasting pressure transfer plate assembly 10.

Figure 5:
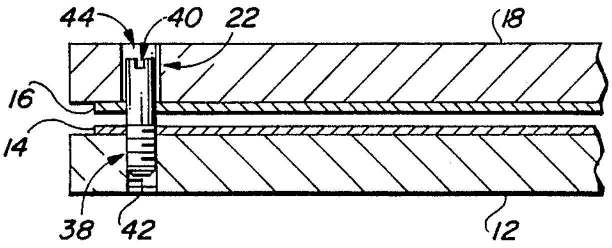
FIG. 5 is a sectional side view as indicated in FIG. 1, showing details of a quick-replacement plate alignment pin.

FIG. 5 is a sectional view of pressure transfer plate assembly 10 as indicated in FIG. 1. Details of one of the plate alignment pins 22 can be seen in FIG. 5. Plate alignment pin 22 comprises a threaded portion 38 at one end and a slotted head portion 40 at the other. A hole 42 is drilled through bottom plate 12 and tapped to accommodate threaded end 38 of pin 22. Slotted head portion 40 of pin 24 fits into hole 44 drilled through top plate 18. This arrangement allows quick replacement of a pin 22 should it become worn, bent, or broken. Pin 22 is easily removed by applying the blade of a screwdriver to slotted head portion 40. Typically pin 22 will be made from 0.25-inch diameter steel drill rod.

In one particular embodiment of the present invention, the plates 12, 18 are formed of rectangular aluminum pieces, each approximately 17×36 inches. A first plurality of holes mounting the workpiece-locating pins 24 in the bottom plate 12 have a diameter of approximately 0.207 inch. A second plurality of holes 20 in the bottom plate 12 have a diameter of approximately 0.281 inch. Liners 14, 16 are formed in thin sheets of 302 stainless steel, each being 0.090 inch thick. The quick-replacement plate alignment pins 22 are formed of 0.25-inch diameter steel drill rod, each being 3.0 inches long. Each of the plug inserts 28 is generally cylindrical with a diameter of about 0.75 inch. The disk-shaped recesses 30 are about 0.062 inch deep with a diameter of about 0.50 inch.

Release sheets of 1-mil Teflon film are used to separate each panel being laminated from the stainless steel liners in the case of multilayer boards or the silicone rubber liners in the case of most flex harnesses. Two release sheets are used for each panel (one on each side).

Although there have been described above one specific arrangement of a pressure transfer assembly for a heat bonding apparatus in accordance with the invention for the purpose of illustrating the manner in which the invention may be used to advantage, it will be appreciated that the invention is not limited thereto. Accordingly, any and all modifications, variations or equivalent arrangements which may occur to those skilled in the art should be considered to be within the scope of the invention as defined in the annexed claims.

What is claimed is:

1. A pressure transfer plate assembly for use in a printed wiring board and flex harness heat bonding apparatus, comprising:

a bottom plate having a first plurality of holes therethrough in a first predetermined pattern of locations and a second plurality of holes therethrough in a second predetermined pattern of locations, each of said second plurality of holes being internally threaded over a portion thereof;

a plurality of plug inserts having flat, parallel top and bottom surfaces, fitted into said first plurality of holes in said bottom plate, each said insert having a recess in said top surface;

a plurality of workpiece locating pins, each said pin having a base portion and an elongated body, with said base portion having been fitted into said recess of one of said plurality of inserts;

a plurality of quick-replacement plate alignment pins, each said quick-replacement pin having a head portion at one end thereof and a threaded portion at another end thereof, with said threaded portion having been screwed into one of said second plurality of holes in said bottom plate;

a top plate having a plurality of holes therethrough corresponding to said predetermined patterns of holes in said bottom plate, with said workpiece locating pins and said quick-replacement plate alignment pins extending into said holes in said top plate; and a plurality of thin liners, each said liner having a plurality holes therethrough corresponding to said predetermined patterns of holes in said bottom plate, said liners being disposed between said top and bottom plates to separate distinct assembled workpieces during heat bonding.

2. The pressure transfer plate assembly of claim 1 wherein said plug inserts are steel and have been press-fitted into said first plurality of holes in said bottom plate.

3. The pressure transfer plate assembly of claim 1 wherein each of said first plurality of holes in said bottom plate is cylindrical and each said insert is cylindrical also.

4. The pressure transfer plate assembly of claim 1 wherein said head portion of each said quick-replacement plate alignment pin has a transverse slot therein to accommodate a screwdriver blade.

5. The pressure transfer plate assembly of claim 1 wherein said base portion of each said workpiece locating pin is disk-shaped and said body portion is generally cylindrical and extends from said base portion; and wherein said recess of each said insert has a shape matching that of said base portion of said workpiece locating pin.

6. The pressure transfer plate assembly of claim 1 wherein said top and bottom plates comprise aluminum.

7. The pressure transfer plate assembly of claim 1 wherein said top and bottom plates are generally rectangular, with said first predetermined pattern of holes comprising:

a first location close to a first corner of each said plate;

a second location close to an opposite corner of each said plate; and a third location on an imaginary line parallel to a long side of each said plate and passing through said second location.

8. The pressure transfer plate assembly of claim 7 wherein said second predetermined pattern of locations is determined by the locations of a plurality of holes in said workpieces being bonded.

9. The pressure transfer plate assembly of claim 1 wherein said plates are approximately $17\times36$ inches, each of said first plurality of holes has a diameter of approximately 0.207 inch, and each of said second plurality of holes has a diameter of approximately 0.281 inch.

10. The pressure transfer plate assembly of claim 1 wherein said workpieces are bonded into multilayer printed circuit boards and each said liner comprises 302 stainless steel 0.090 inch thick.

11. The pressure transfer plate assembly of claim 1 wherein said workpieces are bonded into flex harnesses and each said liner comprises silicone rubber.

12. The pressure transfer plate assembly of claim 1 wherein each said quick-replacement pin comprises 0.25-inch diameter by 3.0 inch long steel drill rod.

13. The pressure plate assembly of claim 1 wherein each said insert is generally cylindrical with a diameter of about 0.75 inch and said recess is approximately 0.062 inch deep and has a diameter of about 0.50 inch.

14. The pressure transfer plate assembly of claim I further comprising a plurality of release sheets, with a pair of said release liners sandwiching each workpiece being bonded.

15. The pressure transfer plate assembly of claim 14 wherein said release sheets comprise 1-mil Teflon film.

* * * * *